(12) United States Patent
Krüger

(10) Patent No.: US 6,881,138 B2
(45) Date of Patent: Apr. 19, 2005

(54) METHOD AND FACILITY FOR CUTTING OFF HIND FEET OF HALF CARCASSES

(75) Inventor: Peter Krüger, Esbjerg (DK)

(73) Assignee: KJ Maskinfabriken A/S, Esbjerg V (DK)

( * ) Notice: Subject to any disclaimer, the term of this patent is extended or adjusted under 35 U.S.C. 154(b) by 0 days.

(21) Appl. No.: 10/466,682

(22) PCT Filed: Jan. 22, 2002

(86) PCT No.: PCT/DK02/00043

§ 371 (c)(1),
(2), (4) Date: Jan. 8, 2004

(87) PCT Pub. No.: WO02/062146

PCT Pub. Date: Aug. 15, 2002

(65) Prior Publication Data

US 2004/0116061 A1 Jun. 17, 2004

(30) Foreign Application Priority Data

Jan. 22, 2001 (DK) ........................ 2001 00108

(51) Int. Cl.$^7$ ................................ A22B 5/20
(52) U.S. Cl. .................. 452/154; 452/163; 452/166
(58) Field of Search ................... 452/150, 151, 452/154, 163, 166, 167; A22B 5/00

(56) References Cited

U.S. PATENT DOCUMENTS

| | | | |
|---|---|---|---|
| 2,423,930 A | 7/1947 | Duff | |
| 3,916,484 A | 11/1975 | Kennedy | |
| 4,557,014 A * | 12/1985 | Vogt | ........................ 452/151 |
| 4,662,029 A | 5/1987 | Helsene et al. | |
| 5,180,329 A * | 1/1993 | Meyer | ........................ 452/166 |
| 5,433,659 A * | 7/1995 | Meyer | ........................ 452/167 |
| 5,727,997 A | 3/1998 | Dufour et al. | |

FOREIGN PATENT DOCUMENTS

| | | | |
|---|---|---|---|
| DK | 0607744 | 7/1994 | |
| EP | 0 607 744 B1 | 9/1997 | |
| EP | 607744 B1 * | 9/1997 | ............ A22B/5/00 |

* cited by examiner

Primary Examiner—Teri Pham Luu
Assistant Examiner—Susan C. Alimenti
(74) Attorney, Agent, or Firm—Nixon Peabody LLP; David S. Safran

(57) ABSTRACT

With the intention of performing an optimal cutting of the hind feet (8) of the half carcasses (4), which are advanced stepwise on an overhead conveyor (6) suspended in the hind feet (8), there is indicated a method and a plant for performing an optimal hind foot cutting.

Figure 1:
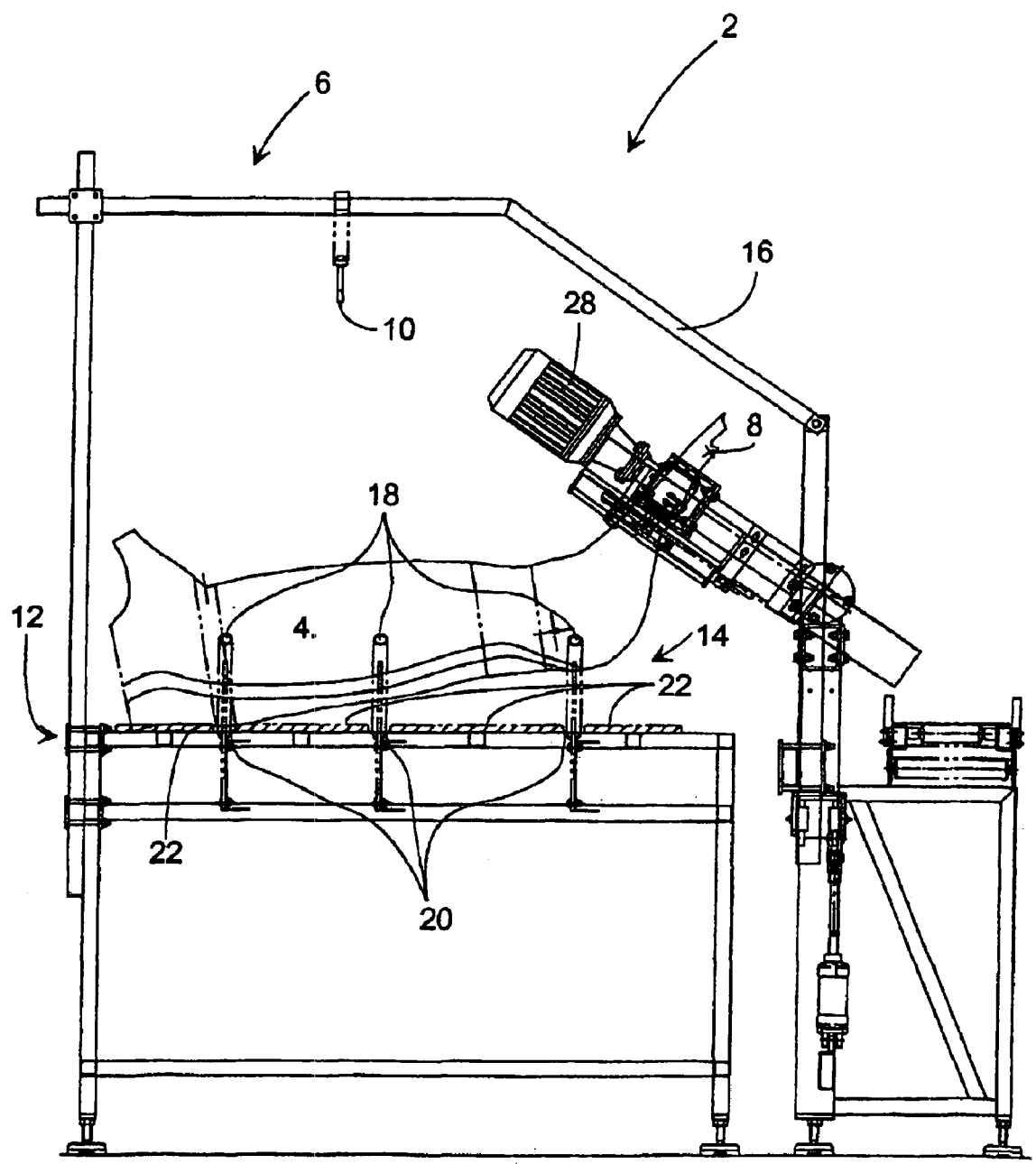

According to the invention, cutting of the hind feet (8) occurs by the half carcasses (4) being gripped by pivoting gripping mechanisms (26) the clear of which in the gripping position not allowing the heel joint (29) to pass through this. As the variation of the thickness of the heel joint on a carcass is very small, a lifting of the ham (32) of the half carcass by displacing the gripping mechanisms (26) will result in the position of the thickest point of the heel joint being well-defined, whereby there is achieved a very great uniformity of the hind foot cutting by the same displacement pattern of the gripping mechanisms (26) in cross-wise direction in relation to saw blades (30) situated in a plane well-defined in advance.

12 Claims, 3 Drawing Sheets

METHOD AND FACILITY FOR CUTTING OFF HIND FEET OF HALF CARCASSES

The present invention concerns a method and a plant for processing half carcasses where at least one half carcass is advanced stepwise suspended by its hind foot on hooks on a conveying rail across a conveyor, to which conveyor the half carcass is transferred when it is released from the hook, and by which method the hind foot of the half carcass is automatically cut off.

It is to be mentioned that the plant will typically comprise advancing of two half carcasses at a time, which is why it is not important in the following whether the case is about advancing one or two half carcasses in connection with the method and the plant according to the invention, as this will not change the basic principles behind this.

Such a plant is known from DK T3 0607744 where the hind feet are cut off automatically by circular saws as the substantial part of the weight of the half carcasses are transferred to the conveyor before the cutting takes place. The half carcasses are here transferred to the conveyor from an overhead conveyor situated above the conveyor, which has a downward inclining section across the conveyor, where the carcasses are towed transversely of the conveyor belt under the transfer of the weight of the bodies to this until the saws cut the hind feet, and the weight from the ham of the carcass is finally transferred completely to the conveyor. The plant furthermore comprises control and retainer devices in the shape of fixed guides and stops controlling or holding the hooks and/or the hind feet relative to the saws during the transfer of the carcasses to the conveyor belt.

In spite of the said control and retainer devices and insertion of stops for the advancing of the hooks on the overhead conveyor, an optimal cut for cutting off the hind feet of the carcasses will be relatively random, as no really controlled guiding and holding of the ham is performed during the act of cutting the hind foot.

By the invention it has been realised that it is possible to perform a more precise hind foot cutting on half carcasses by performing this as indicated in the characterising part of claim 1.

By using the pivotable/displaceable mechanical gripping means gripping the ham between the heel and the knee joint, according to the method of the invention there is achieved that the hind feet of the half carcasses by turning the gripping means away from the centre line of the overhead conveyor are released from the hooks before a cutting of the hind feet is performed.

The movement of the gripping means may be described as an outward and upward directed movement in relation to the overhead conveyor, whereby the hind feet, as mentioned, are released from the hook. By the upward movement, the hams and the heel joint are elevated in level with the plane in which blades on saws disposed at each side of the overhead conveyor, and by a continuous lateral displacement of the gripping mechanisms, the heel joints of the carcasses may be passed through cutting units whereby the hind foot cutting occurs.

What is utilised by the invention is that the gripping mechanisms in the closed state engaging the hams do not allow the heel joints on the hams to pass through the gripping mechanisms. I.e. the hams by the upward inclining displacement of the gripping mechanisms slide within these until there is achieved contact between the upper sides of the gripping mechanisms and the heel joints on the hams, whereby the sliding stops, after which the elevation is continued up until the level of the planes of the saw blades is achieved, where after the hind foot sawing occurs by a largely pure lateral displacement of the gripping mechanisms. By the invention is utilised the fact that the variation of the size of the heel joint on a carcass irrespectively of the length of the carcass is very small, which means that the positioning of the hams in these by handling carcasses with different lengths is practically identical. This means that by ensuring sufficient elevation of the ham, which is possible due to the hind feet previously being released from the hooks, by adjusting the lifting height of the surrounding gripping mechanisms, by the same displacement pattern of the gripping mechanisms, there is achieved a very great uniformity and precision in the location of the hind foot cut by using the method according to the invention.

However, in special cases, by using detection equipment for localising the thickest spot on the heel joint in combination of a control system it will be possible to compensate the upward and outward movement of the gripping mechanism, so that the hind foot cut is placed precisely transversely to the thickest part of the heel joint.

The advantages achieved by the method are thus that there may be allowed for a greater variation of the lengths of the half carcasses to be processed, while at the same time ensuring by the very precise positioning of the hind feet of the half carcasses that a uniform hind foot cut is performed, which preferably is to occur at a transverse sawing over of the heel joint at its thickest place. Furthermore, it will be easier to handle the feet cut off for subsequent treatment as these are collected in funnels without having to be removed first manually from the hooks or by particular subsequent operations, as the hind feet at the gripping mechanisms are removed from the hook before the hind foot cut is performed.

Sometimes is used a multi-track conveyor with belts spaced apart and driven synchronously, and where in the spacings there are horizontally and vertically displaceable laying fixtures intended for angling the half carcass(es) in relation to the direction of advancing of the conveyor before the carcass(es) are moved to further processing by the conveyor. The angling of the half carcass(es) and laying down thereof upon the conveyor occurs by a horizontal and vertical displacing, respectively, of the laying fixtures. The method indicated in claim 2 indicates how the method according to the invention may be used together with the above laying down module.

Sometimes it may be preferred to do the hind foot cut in such a way that the ham of the half carcass is lifted upwards and to the side by means of the gripping mechanisms engaging the heel joint so that the hind foot is released from the hook, but where the lateral movement of the gripping mechanisms is limited to this movement, and where the ham is kept in a position, which is advantageous for the performing of the hind foot cut, by means of laterally displaceable circular saws. The advantage of this method will be that the gripping mechanisms ensure that the hind foot cut is made where the heel joint is thickest.

By an inclining position of the saw blades of the circular saws there is achieved an optimal cutting angle in relation to the position of the heel joint when this is held in the gripping mechanisms.

A plant for performing the method according to the invention includes an overhead conveyor by which there is stepwise advanced at least one half carcass suspended by its hind foot in a hook, a conveyor disposed under the overhead conveyor, where the half carcasses are subsequently transferred to the conveyor by a downward inclining section of the overhead conveyor across the conveyor belt for further transport of the half carcasses to further processing, and where in the area, where the half carcass is transferred to the conveyor belt, there is at least a cutting device for cutting off the hind foot from the half carcasses, is characterised in that it includes an inclining receiving bracket arrangement for securing the orientation of the half carcasses with the rind side downward when these are laid down upon the conveyor belt during a downwards directed advancing, that it further comprises at least an actuator driven, displaceable mechanical gripping mechanism for gripping and handling the hind legs of the carcass by engagement between the knee joint and the heel joint when the carcass has been advanced by the overhead conveyor to a given stop, and at least one cutting device with a blade situated at a level above the gripping mechanism and below the hook for cutting off the hind foot of the carcass transversely of the heel joint where this is thickest.

With the object of using the gripping mechanisms as guide means for the heel joint during the performing of the hind foot cutting for ensuring a correctly placed cut, the gripping mechanisms may be pivotable in horizontal and/or vertical direction between the point of attack and an extreme position at a distance which is situated farther from the centre line of the overhead conveyor. Hereby is achieved that by vertical displacement of the gripping mechanism, the ham of the half carcass may be lifted a bit so that the heel joint slides in place in the gripping mechanism, but a well-defined placing of the thickest part of this before the hind foot cutting takes place by a horizontal displacing of the gripping mechanism to the extreme position, whereby the heel joint is moved transversely of the blade on the cutting device. By the latter displacement, the hind foot is additionally displaced out of engagement with the hook.

With the purpose of the performing the hind foot cutting most optimally, the cutting device may advantageously be disposed relative to the gripping mechanisms so that the heel joint on a half carcass is moved transversely of the blade of the cutting device by angling the pivotable gripping mechanisms from the point of attack to the extreme position is moved transversely of the place where the heel joint is thickest.

The cutting devices may advantageously be constituted by circular saws as indicated in claim 9.

The plant may advantageously be adapted so that the circular saws are suspended in a laterally displaceable way and that lateral displacement of the circular saws takes place by actuators.

With the purpose of achieving an optimal placing of the hind foot cut, the blades of the circular saws may be disposed incliningly.

In some cases where a precise positioning of the half carcass on the conveyor is important, the plant conveyor may be constituted by a multi-track conveyor with belts oriented in parallel and spaced apart and driven synchronously in the same direction, and which conveyor further comprises horizontally and vertically displaceable laying fixture brackets, which protrude up through the interspaces between the belts of the conveyor, and which laying fixture brackets are vertically displaceable so that the upper ends of these are situated below the surfaces of the conveyor belts, and so that their lowest points are situated some distance above the surfaces of the conveyor belts.

The horizontal displacement of the laying fixture brackets may be made around a turning point so that an envisaged line drawn between the low points of the outermost laying fixture brackets forms an angle with the direction of movement of the conveyor, whereby the half carcass(es) is disposed lying inclining in relation to the direction of advancing by lowering the laying fixture brackets. However, it is to be emphasised that the horizontal displacement of the laying fixture brackets is not necessarily utilised, but that the use of the said brackets ensures a very uniform positioning of the half carcasses supplied to the conveyor just by performing a vertical displacement of the laying fixture brackets.

Figure 2:
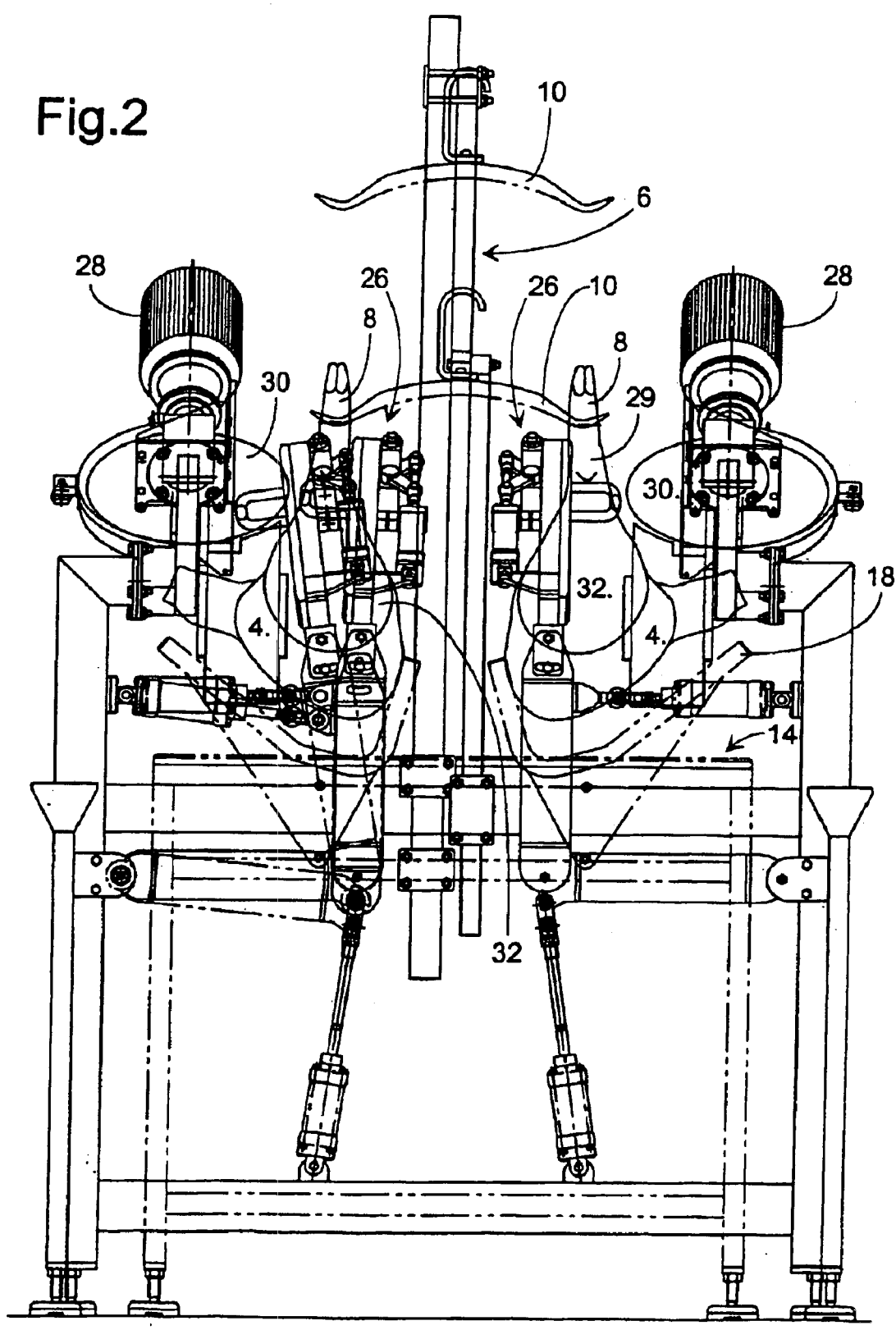
Figure 3:
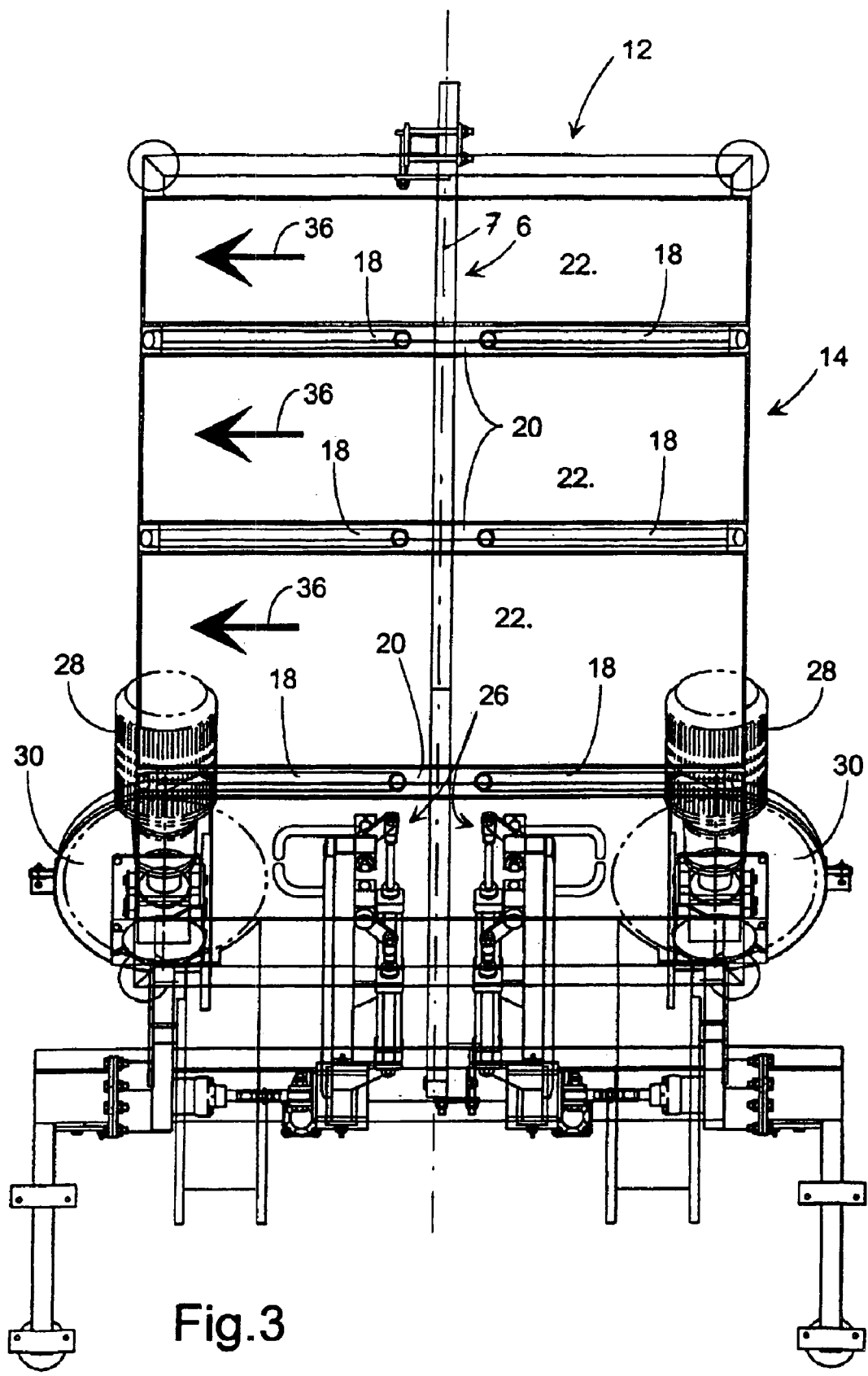

The invention is explained more closely in the following with reference to the drawing wherein:

FIG. 1 is a side view of a plant for processing half carcasses according to the invention, FIG. 2 is an end view of the plant shown in FIG. 1, and FIG. 3 is a top view of the plant shown in FIGS. 1 and 2.

In FIG. 1 is seen a plant 2 according to the invention for processing half carcasses 4 which are advanced stepwise on an overhead conveyor 6 suspended in their hind feet 8 in hooks 10.

In FIG. 1, the half carcasses have passed two not shown, about 45° inclining receiving bracket arrangements which are disposed at the feeding side 12 of a multi-track conveyor 14 located below the overhead conveyor 6, whereby the half carcasses 4 during a forward and downward movement in the overhead conveyor 6 at an about 40° downward bend on the support rail 16 of the conveyor are laid down with the rind side facing down in horizontally and vertically displaceable laying fixture brackets 18 which in FIG. 1 protrude through the interspacings 20 between the belts 22 of the conveyor. The carcasses are thus not laid down on the conveyor belt 22 at the time where the half carcasses 4 (cf. FIG. 1) are advanced to a point where the pivotably suspended actuator driven gripping mechanisms 2, cf. FIG. 2 and FIG. 3, are activated and are gripping around the hams 32 of the half carcasses by the hind legs between their heel joints 29 and knee joints (not shown), after which the gripping mechanisms 26 are pivoted upwards and outwards in direction away from the centre line 7 of the overhead conveyor 6, whereby the hind feet 8 are released from the hook 10, and by the continued turning of the gripping mechanisms 26, the hams slide in the gripping mechanisms 26 until their upper sides are in contact with the undersides of the heel joints and so that the hams are lifted until the thickest parts of the heel joints are at level with the saw blades 30 on circular saws 28, which are disposed with further lateral spacing form the overhead conveyor 6, after which the heel joints 29 with a lateral displacement of the gripping mechanisms 26 are moved transversely of the saw blades 30, whereby the hind foot cutting is performed. The gripping mechanisms 26 are then opened and immediately afterwards moved back to the starting position closer to the overhead conveyor 6 for receiving new stepwise advanced half carcasses, and the hams of the carcasses then fall down upon the laying fixture brackets 18.

The hind feet 8 now cut off are collected in a not shown funnel and are then conveyed to further processing.

The half carcasses 4 now freed from hind feet 8 may then be positioned in a desired angle in relation to the direction of movement 34 of the conveyor 14 by horizontal displacement of the laying fixture brackets 18, after which the carcasses 4 are laid down by vertical displacement of the fixture brackets 18 down in the spacings 20 between the belts 22 of the conveyor, cf. FIG. 2 and FIG. 3.

The method and the plant according to the invention have several advantages, inter alia that the hind feet 8 are released from the hooks 10, while at the same time the heel joint 29, by means of the gripping mechanisms 26, is moved to sawing through or to an advantageous position therefore. Hereby is achieved that a greater variation of the lengths of the half carcasses 4 processed in the plant 2 may be allowed, while at the same time there may be performed a more uniform hind foot cut than by the prior art plants.

A further advantage achieved by the method and the plant according to the invention is that the hind feet 8 cut off are removed from the hooks 10 and are collected via funnel (not shown) or other collecting means for further processing which results in an work saving, since by the prior art processing plants the hind feet are still on the hooks after the hind feet cutting and have to the be removed from these before the hooks may be used again.

It is to be emphasized that the described embodiment of the plant 2 shown in the Figures for processing carcasses according to the invention does not necessarily include the shown laying fixture brackets 18, as these normally are only necessary in connection with performing a precise laying of the half carcasses 4 with a given angle in relation to the direction of movement 36 of the conveyor which is used in connection with automatic performing one or more optimised succeeding cuts. However, it is to be mentioned, that the laying fixture brackets may have an advantageous influence on the precision of the positioning of the hind foot cut. But the half carcasses may just as well be laid down on a conveyor of the type which traditionally is used for further transport of half carcasses.

Consequently, this means that an embodiment comprising a quite common conveyor of the kind normally used for such plants may be viewed as an approximately equal solution compared with the one indicated in the embodiment with regard to performing uniform hind foot cutting.

Furthermore, it is to be mentioned that the hind foot cutting is not always performed by the gripping mechanisms 26 moving the heel joints of the hams through the circular saws 28,30, as the gripping mechanisms 26 may be so adjusted that these are gripping the hams 32 as already indicated and lift the heel joint 29 up and outward so that the hind foot is released from the hooks, and so that the thickest point of the heel joint is situated in the planes of the saw blades so that the saws 28, which here are laterally suspended and actuator driven, are displaced towards the heel joints for performing the hind foot cutting. It is to be mentioned that this method is also usable in connection with the embodiment of the plant comprising the multi-track conveyor with the vertically/horizontally disposable laying fixture brackets.

What is claimed is:

1. A method for processing half carcasses (4) where at least one half carcass is advanced stepwise suspended by its hind foot (8) on hooks (10) on a conveying rail (6) across a conveyor (14) comprised of conveyor belts, to which conveyor (14) the half carcasses (4) are transferred when they are released from the hook (10), and by which method the hind foot (8) is automatically cut off, characterised by the process steps of:
    a) advancing the half carcass (4) over two downwardly inclined receiving bracket arrangements at interspacings of the conveyer belts (22) of the conveyor (14) so as to lay the half carcass down upon the belts (22) of the conveyor with the rind side down;
    b) stopping the movement of the hook (10) at a predetermined position at which the hind legs of the half carcass are gripped by two actuator driven gripping mechanisms (26) between knee joint and heel joint (29);
    c) moving the gripping mechanisms (26) upwards and outwards away from the centre line (7) of the conveyor rail (6), whereby the hind feet (8) are released from the hook (10) and the ham (32) is thereby brought to hang in the gripping mechanisms (26) so that the thickest part of the heel joint (29) is elevated to the level of the planes of saw blades (30) on saws (28), disposed at each side of the overhead conveyor (6),
    d) continuing the movement of the gripping mechanisms directed outward and away from the centre line (7) of the conveying rail (6) whereby the hind feet (8) are cut off at the heel joint (29) by transversely advancing the heel joint across said saw blades (30);
    e) further stepwise advancing the hook (10);
    f) releasing the grip of gripping mechanisms (26) on the hind legs and lowering the ham (32) of the carcass down upon the conveyor belt (14);
    g) moving the gripping mechanisms (26) back to the starting position for receiving the next at least one carcass (4) advanced by the overhead conveyor (6).

2. A method for processing carcasses (4) according to claim 1, wherein:
    the belts (22) are oriented in parallel and spaced apart and driven synchronously in the same direction, wherein the receiving bracket arrangement over which the half carcass is advanced comprises vertically and horizontally displaceable fixture brackets (18) which protrude up through the interspaces (20) between the belts (22) of the conveyor; and
    after the gripping mechanisms (26) release their grip, the ham (32) of the carcass falls down upon the underlying fixture brackets (18), whereby the half carcass (4) rests in the fixture brackets, which are lowered subsequently, whereby the carcass (4) is laid upon the conveyor belt (22).

3. A method according to claim 1, characterised in that the hind foot cutting is made by a circular saw (28), the edge (30) of which is situated at a level above the gripping mechanisms (26) and below the course of movement of the hook.

4. A method according to claim 1, characterised in that alternatively, the cutting of the hind foot (8) is performed by at least one laterally displaceable circular saw (28) subsequent to the hind foot (8) being released from the hook by displacement of the gripping mechanisms (26), and the ham (32)/hind foot (8) are positioned at a position favourable for the making of the hind foot cut in relation to the plane in which the edges (30) are displaced, as the movement of the gripping mechanisms (26), as indicated in claim 1, is limited by omitting performing process step d.

5. A method according to claim 1, characterised in that the edge (30) of the circular saw is inclined.

6. A plant for processing half carcasses including an overhead conveyor (6) by which there is stepwise advanced at least one half carcass (4) suspended by its hind foot (8) in a hook (10), a conveyor (14), disposed under the overhead conveyor (6), where the half carcasses (4) are subsequently transferred to the conveyor (14) by a downward inclining section (16) of the overhead conveyor across the conveyor belt (22) for further transport of the half carcasses to further processing, and where, in the area where the half carcasses (4) are transferred to the conveyor belt, there are cutting devices (28,30) for cutting off the hind feet (8) from the half carcasses (4), wherein an inclined receiving bracket arrangement is provided for securing the orientation of the half carcass (4) with the rind side downward when said half carcasses (4) are laid down upon the conveyor belt (22) during a downwards directed advancing, further comprising actuator driven, displaceable mechanical gripping mechanisms (26) for gripping and handling the hind legs of the carcass by engagement between the knee joint and the heel joint (29) when the carcasses (4) have been advanced by the overhead conveyor (6) to a given stop, means for moving the gripping mechanisms (26) upward and outward away from the center line (7) of the overhead conveyor (6) so as to release the hind feet from the hook (10) and thereby bringing the ham (32) to hang in the gripping mechanisms (26) with the thickest part of the heel joint (29) elevated to the level of a blade of at least one cutting device (28) situated at a level above the gripping mechanisms (26) and below the hooks (10) for cutting off the released hind feet of said carcasses transversely of the heel joint (29), preferably where said heel joint is thickest, during transverse advancement of the heel joint across said blade by continued movement of the gripping mechanisms outward and away from the center line of the overhead conveyor.

7. A plant (2) for processing carcasses (4) according to claim 1, characterised in that the gripping mechanisms (26) are pivotable in horizontal and/or vertical direction between the point of attack and an extreme position at a distance located farther from the centre line (7) of the overhead conveyor.

8. A plant according to claim 1, characterised in that the gripping mechanisms (26) are pivotable gripping mechanisms, and in that the cutting device (28) is disposed relative to the gripping mechanisms so that the heel joint (8) on the half carcasses (4) is moved transversely of the blade (30) of the cutting device by swinging the pivotable gripping mechanisms (26) from the point of attack to the extreme position, whereby the hind foot cutting takes place transversely of the heel joint (29), preferably where this is thickest.

9. A plant (2) for processing carcasses (4) according to claim 6, characterised in that the cutting devices are constituted by circular saws (28, 30).

10. A plant (2) for processing carcasses (4) according to claim 9, wherein that the circular saws (28,30) are laterally displaceable in a plane oriented transversely of the heel joint, and that lateral displacement of the circular saws (28, 30) occurs by actuators.

11. A plant (2) for processing half carcasses (4) according to claim 9, characterised in that the blades (30) of the circular saws are inclined.

12. A plant (2) for processing half carcasses including an overhead conveyor (6) by which there is stepwise advanced at least one half carcass (4) suspended by its hind foot (8) in a hook (10), a conveyor (14), disposed under the overhead conveyor (6), where the half carcasses (4) are subsequently transferred to the conveyor (14) by a downward inclining section (16) of the overhead conveyor across the conveyor belt (22) for further transport of the half carcasses to further processing, and where, in the area where the half carcasses (4) are transferred to the conveyor belt, there are cutting devices (28,30) for cutting off the hind feet (8) from the half carcasses (4), wherein an inclined receiving bracket arrangement is provided for securing the orientation of the half carcass (4) with the rind side downward when said half carcasses are laid down upon the conveyor belt (22) during a downwards directed advancing, further comprising an actuator driven, displaceable mechanical gripping mechanisms (26) for gripping and handling the hind legs of the carcass by engagement between the knee joint and the heel joint (29) when the carcasses (4) have been advanced by the overhead conveyor (6) to a given stop, and at least one cutting device (28) with a blade (30) situated at a level above the gripping mechanisms (26) and below the hooks (10) for cutting off the hind foot of said carcasses transversely of the heel joint (29), preferably where said heel joint is thickest; and wherein the conveyor (14) is constituted by a multi-track conveyor with belts (22) oriented in parallel and spaced apart and driven synchronously in the same direction, and which receiving bracket arrangement further comprises horizontally and vertically displaceable laying fixture brackets (18), which protrude up through the interspaces (20) between the belts (22) of the conveyor, and which laying fixture brackets (18) are vertically displaceable so that the upper ends of these are situated below the surfaces of the conveyor belts, and so that their lowest points are situated some distance above the surfaces of the conveyor belts.

* * * * *